(12) United States Patent
Rey

(10) Patent No.: US 10,857,912 B2
(45) Date of Patent: Dec. 8, 2020

(54) SCREW-BASED ADJUSTMENT MECHANISM, RAIL COMPRISING SUCH AN ADJUSTMENT MECHANISM, AND SEAT COMPRISING SUCH A RAIL

(71) Applicant: Faurecia Sièges d'Automobile, Nanterre (FR)

(72) Inventor: Jean-Noel Rey, Flers (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 269 days.

(21) Appl. No.: 16/133,126

(22) Filed: Sep. 17, 2018

(65) Prior Publication Data

US 2019/0100118 A1  Apr. 4, 2019

(30) Foreign Application Priority Data

Sep. 29, 2017  (FR) ..................... 17 59116

(51) Int. Cl.
*B60N 2/06* (2006.01)
*F16H 25/20* (2006.01)
*B60N 2/02* (2006.01)

(52) U.S. Cl.
CPC ........... *B60N 2/067* (2013.01); *B60N 2/0232* (2013.01); *F16H 25/20* (2013.01); *B60N 2002/0236* (2013.01); *B60N 2205/20* (2013.01); *F16H 2025/209* (2013.01)

(58) Field of Classification Search
CPC ...................... F16H 2025/209; B60N 2205/30
See application file for complete search history.

(56) References Cited

U.S. PATENT DOCUMENTS

| 2,385,194 | A | * | 9/1945 | Carroll | ...................... F16H 1/16 |
| | | | | | 74/441 |
| 3,186,249 | A | * | 6/1965 | Lanzenberger | .......... B23Q 5/56 |
| | | | | | 74/409 |
| 4,509,382 | A | * | 4/1985 | Colautti | ............... B60N 2/0224 |
| | | | | | 248/405 |

(Continued)

FOREIGN PATENT DOCUMENTS

| FR | 2882974 A1 | 9/2006 |
| WO | WO2011150489 A1 | 12/2011 |

OTHER PUBLICATIONS

French Search Report corresponding to French application No. FR 1759116, dated May 15, 2018, 6 pages.

*Primary Examiner* — Howard J Sanders
*Assistant Examiner* — Gregory T Prather
(74) *Attorney, Agent, or Firm* — Reising Ethington P.C.

(57) ABSTRACT

An adjustment mechanism the includes a screw, a support having first and second transverse walls perpendicular to the screw, a casing having first and second end faces arranged facing the first and second transverse walls and having a nut housing which opens in opposite first and second openings, a first elastomer pad interposed between the first transverse wall of the support and the first end face of the casing, a second elastomer pad interposed between the second transverse wall of the support and the second end face of the casing, a nut screwed onto the screw, a bearing engaged in the second opening of the casing and traversed by the screw. The nut is in rigid abutment against the casing in the direction of the first opening and the bearing is in elastic abutment against the second elastomer pad.

10 Claims, 5 Drawing Sheets

(56) References Cited

U.S. PATENT DOCUMENTS

| | | | | |
|---|---|---|---|---|
| 4,954,032 A * | 9/1990 | Morales | F16H 25/2006 | 411/289 |
| 5,797,293 A * | 8/1998 | Chaban | B60N 2/0232 | 74/89.36 |
| 5,816,555 A * | 10/1998 | Ito | B60N 2/067 | 248/429 |
| 5,860,319 A * | 1/1999 | Via | B60N 2/0232 | 248/429 |
| 6,158,720 A * | 12/2000 | Patrick | B66F 3/18 | 254/103 |
| 8,226,063 B2 * | 7/2012 | Weber | B60N 2/0705 | 248/429 |
| 8,820,694 B2 * | 9/2014 | Tarusawa | B60N 2/067 | 248/430 |
| 10,144,310 B1 * | 12/2018 | Ferenc | B60N 2/067 | |
| 10,640,014 B2 * | 5/2020 | Taniguchi | B60N 2/067 | |
| 2002/0060488 A1 * | 5/2002 | Delmas | B60N 2/164 | 297/344.16 |
| 2004/0012236 A1 * | 1/2004 | Mallard | B60N 2/0232 | 297/344.1 |
| 2006/0123938 A1 * | 6/2006 | Gapp | F16H 25/2003 | 74/89.23 |
| 2006/0150758 A1 * | 7/2006 | Wohrle | B60N 2/0232 | 74/89.36 |
| 2006/0213302 A1 * | 9/2006 | Hoffmann | F16H 57/039 | 74/425 |
| 2006/0249644 A1 * | 11/2006 | Folliot | B60N 2/0232 | 248/429 |
| 2008/0282822 A1 * | 11/2008 | Birker | B60N 2/067 | 74/89.39 |
| 2010/0213310 A1 * | 8/2010 | Flatt | F16H 25/2454 | 244/99.2 |
| 2011/0037306 A1 * | 2/2011 | Schuler | F16H 1/32 | 297/353 |
| 2013/0285494 A1 * | 10/2013 | Iversen | F16H 25/20 | 310/83 |
| 2014/0260730 A1 * | 9/2014 | Wu | F16H 25/20 | 74/89.23 |
| 2015/0298581 A1 * | 10/2015 | Nagata | B60N 2/0232 | 248/429 |
| 2015/0330486 A1 * | 11/2015 | Hu | F16H 25/20 | 74/89.14 |
| 2015/0353106 A1 * | 12/2015 | Maeyama | F16H 25/24 | 74/89.14 |
| 2015/0367752 A1 | 12/2015 | Chang et al. | | |
| 2015/0377329 A1 * | 12/2015 | Wu | F16H 25/20 | 74/89.38 |
| 2016/0245381 A1 * | 8/2016 | Birkert | E06B 9/02 | |
| 2017/0328449 A1 * | 11/2017 | Kollreider | F16H 25/2003 | |
| 2017/0332749 A1 * | 11/2017 | Pan | E04H 15/28 | |
| 2018/0029505 A1 * | 2/2018 | Ito | B60N 2/22 | |
| 2018/0163829 A1 * | 6/2018 | Doppler | F16H 25/2266 | |
| 2018/0244305 A1 * | 8/2018 | Cai | B62D 5/0421 | |
| 2018/0345937 A1 * | 12/2018 | Winkler | F16H 25/20 | |
| 2019/0291603 A1 * | 9/2019 | Martiny | B60N 2/0232 | |

* cited by examiner

SCREW-BASED ADJUSTMENT MECHANISM, RAIL COMPRISING SUCH AN ADJUSTMENT MECHANISM, AND SEAT COMPRISING SUCH A RAIL

FIELD OF THE INVENTION

The present invention relates to screw-based adjustment mechanisms, rails comprising such mechanisms, and seats comprising such rails.

BACKGROUND OF THE INVENTION

More particularly, the invention relates to a screw-based adjustment mechanism comprising:
a screw which extends along a longitudinal axis,
a support having first and second transverse walls substantially perpendicular to the longitudinal axis,
a casing mounted on the support between the first and second transverse walls of said support, said casing having first and second end faces respectively arranged facing said first and second transverse walls of said support, and said casing having a nut housing which extends along said longitudinal axis and opens at the first and second end faces of the casing in respective and opposite first and second openings, the screw passing through the first and second openings,
a first elastomer pad interposed in compression between the first transverse wall of the support and the first end face of the casing,
a second elastomer pad interposed between the second transverse wall of the support and the second end face of the casing,
a nut screwed onto said screw, the nut being rotatably mounted in the nut housing of the casing,
a bearing engaged in the second opening of the casing and traversed by the screw, the nut being in rigid axial abutment against the bearing in the direction of the second opening.

Document FR2882974A1 describes an adjustment mechanism of this type, which is entirely satisfactory in its operation. In the adjustment mechanism of document FR2882974A1, the bearing is mounted on the screw without clearance, passes through the second elastomer pad, and abuts against the second transverse wall of the support. This mechanism further comprises an additional bearing mounted on the screw without clearance, passing through the first opening of the casing and the first elastomer pad, the additional bearing being interposed between the nut and the first transverse wall of the support. The nut is mounted between the bearings without clearance.

SUMMARY

An object of the present invention is to further improve adjustment mechanisms of this type, in particular in order to reduce their complexity and cost.

For this purpose, according to an aspect of the invention, an adjustment mechanism of the type in question is characterized in that the nut is in rigid axial abutment against the casing in the direction of the first opening and the bearing is in elastic axial abutment against the second elastomer pad.

"Rigid abutment" is understood here to mean an abutment without elastic clearance compensation, possibly with rigid elements being interposed such as a washer or similar between the two rigid abutment elements.

"Elastic abutment" is understood here to mean an abutment with elastic clearance compensation, for example, due to the elasticity of the elastomer pad.

With these arrangements, all clearance compensation in the mechanism in the longitudinal direction is achieved simply and inexpensively by the first and second elastomer pads. This eliminates having to compensate for clearance between the casing and the support and clearance of the nut within the casing, by two independent clearance compensation systems.

In various embodiments of the adjustment mechanism, one or more of the following arrangements may possibly also be used:
the nut and the bearing are shaped so as to fit axially into the casing through the second opening of said casing;
the casing is a single piece (thus simplifying the structure of the casing and its assembly, and further decreasing the cost of the mechanism, in comparison to the mechanism of FR2882974A1);
the nut comprises first and second cylindrical ends, the first cylindrical end rotating within a bore of the casing and the second cylindrical end fitting into the bearing;
the bearing comprises a flange interposed between the second end face of the casing and the second elastomer pad, axial clearance being provided between said flange and the second end face of the casing;
said flange has a non-circular edge which engages with a rim that is part of the second end face of the casing, in order to immobilize the bearing rotationally relative to the casing;
a rigid washer is interposed axially between the nut and the bearing;
the bearing is made of rigid material, for example metal.

The invention also relates to a rail comprising an adjustment mechanism as defined above, a fixed section, and a movable section integral to the support of the adjustment mechanism and mounted so as to slide relative to the fixed section in parallel to said longitudinal axis, the screw of the adjustment mechanism being integral to the fixed section.

Finally, the invention also relates to a vehicle seat comprising at least one rail as defined above and a seating portion integral to the first movable rail section member of said rail.

BRIEF DESCRIPTION OF DRAWINGS

Other features and advantages of the invention will become apparent from the following description of one of its embodiments, given by way of non-limiting example, with reference to the accompanying drawings.

In the drawings.

DETAILED DESCRIPTION

In the various figures, the same references designate identical or similar elements.

Figure 1:
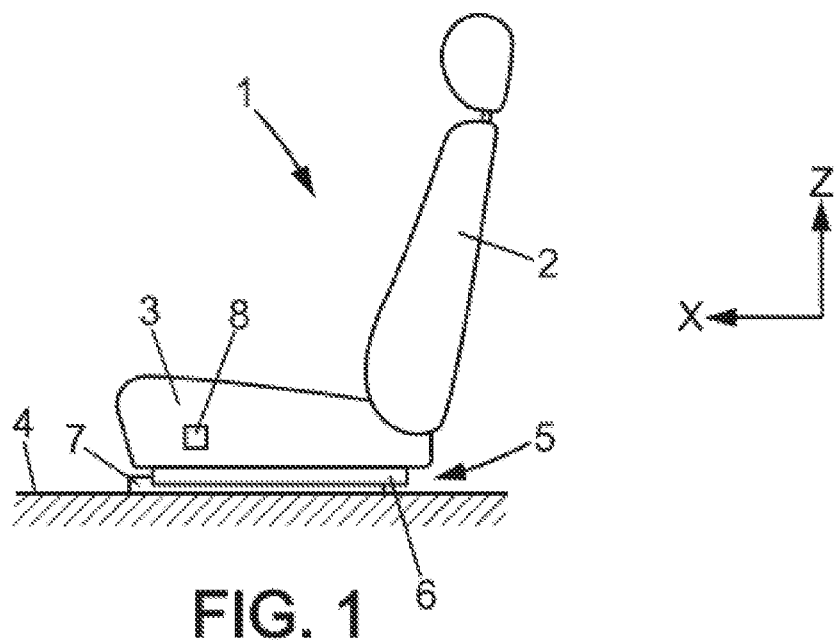
FIGS. 1 and 2 are schematic views, respectively from the side and from the front, of a seat that can comprise rails according to an embodiment of the invention.

FIG. 1 shows a motor vehicle seat 1 which comprises a backrest 2 supported by a seating portion 3 which itself is mounted on the floor 4 of the vehicle so as to slide in a substantially horizontal longitudinal direction X.

The seating portion 3 is connected to the floor 4 by two parallel rails 5, of which only one is visible in FIG. 1.

Figure 2:
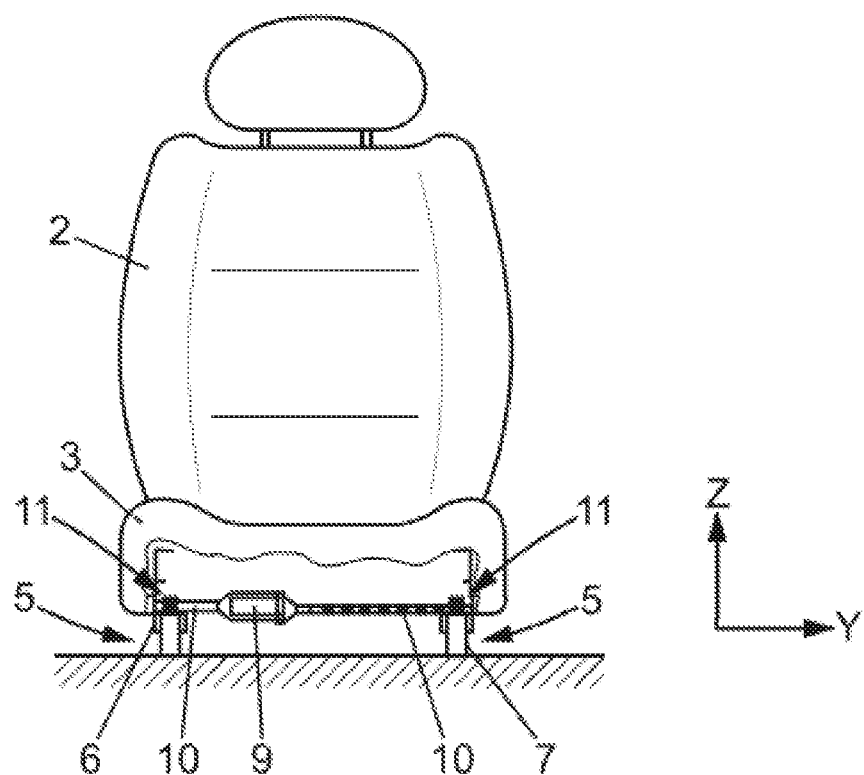

As can be seen in FIG. 2, each of the rails 5 comprises first and second rail members 6, 7 respectively formed by a fixed metal section 6 connected to the floor 4 and a movable metal section 7 connected to the seating portion 3, which slide on one another along the longitudinal direction X.

Here, the rails 5 of the seats are electric motorized rails, controlled for example by means of a button 8 (FIG. 1), arranged for example on the side of the seating portion of the seat, which controls an electric motor 9 respectively driving (for example by means of lines 10) the adjustment mechanisms 11 of the two rails 5 (FIG. 2).

Figure 3:
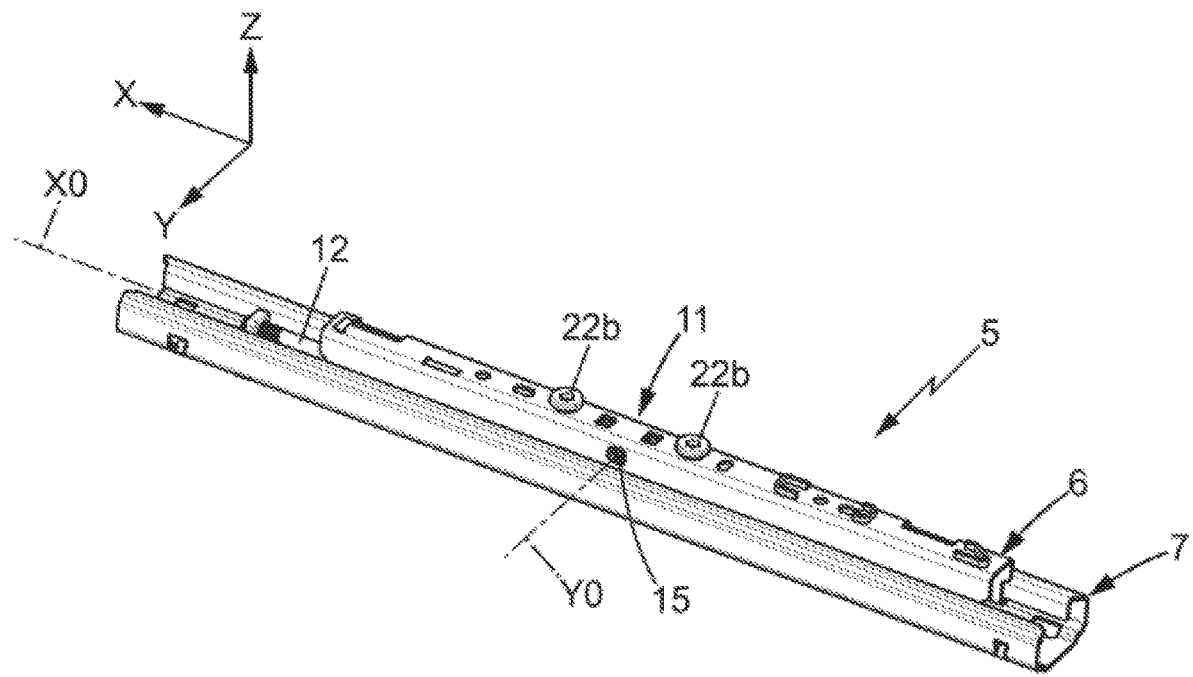
FIG. 3 is a perspective view of one of the rails of the seat of FIGS. 1 and 2.
Figure 4:
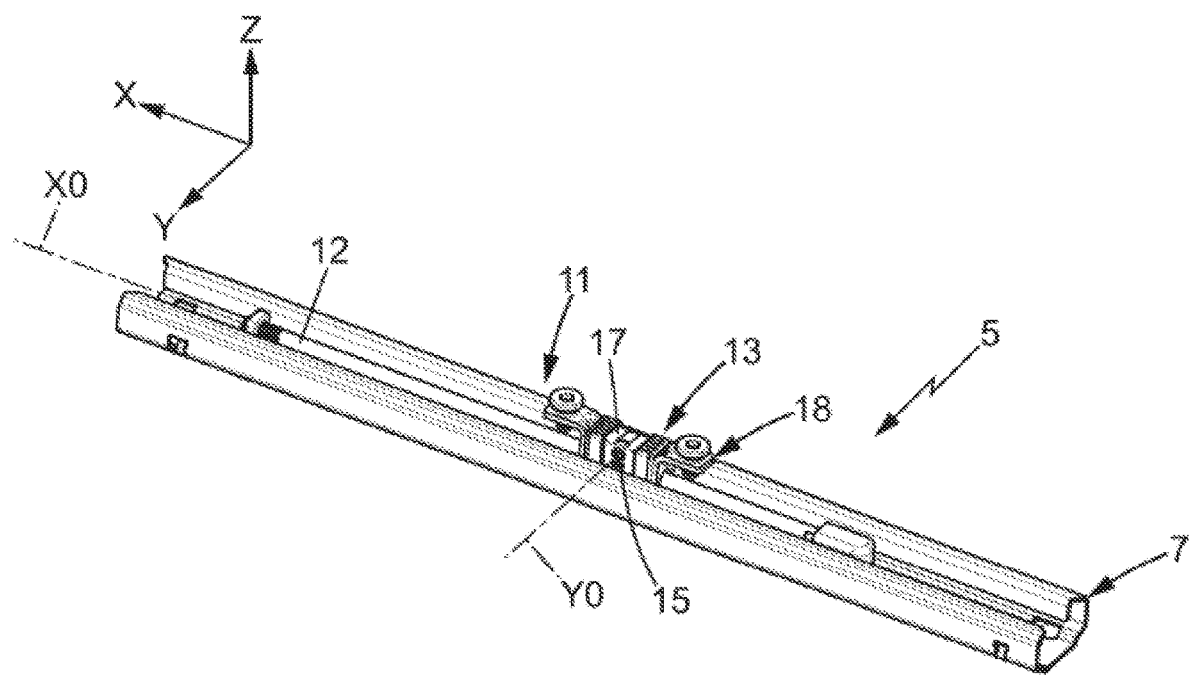
FIG. 4 is a view similar to FIG. 3, without the movable section of the rail.

As represented in FIGS. 3 and 4, the adjustment mechanism 11 of each rail is a screw-based adjustment mechanism, comprising a screw 12 integral to the fixed section 7 and extending along a longitudinal axis X0 parallel to the aforementioned longitudinal direction X.

The adjustment mechanism 11 further comprises a transmission device 13 which may be arranged inside the movable section 6. The transmission device 13 comprises a nut 14 screwed onto the screw 12 and mounted so as to rotate about the longitudinal axis X0 of the screw 12, as is clearly visible in FIGS. 5 to 7.

The nut 14 can be rotated, for example by a worm screw 15 which meshes with external teeth 16 of the nut 14. The worm screw 15 may be rotatable about a transverse axis Y0 parallel to a transverse horizontal direction Y perpendicular to the longitudinal direction X.

The worm screw 15 may be rotated by the motor 9 by means of lines 10 or the like, which pass through the side wall of the movable section 6.

The worm screw 15 and the nut 14 may be rotatably mounted in a rigid casing 17 (for example of metal) carried by a rigid support 18.

The support 18 may have a cradle shape having a horizontal base 19 on which the casing 17 rests. The horizontal base extends in the longitudinal direction X between two ends respectively extended by first and second transverse walls 20a, 20b. The first and second transverse walls 20a, 20b extend in the transverse direction Y and in a vertical direction Z. The first and second transverse walls 20a, 20b may each comprise an opening traversed by the screw 12.

Figure 5:
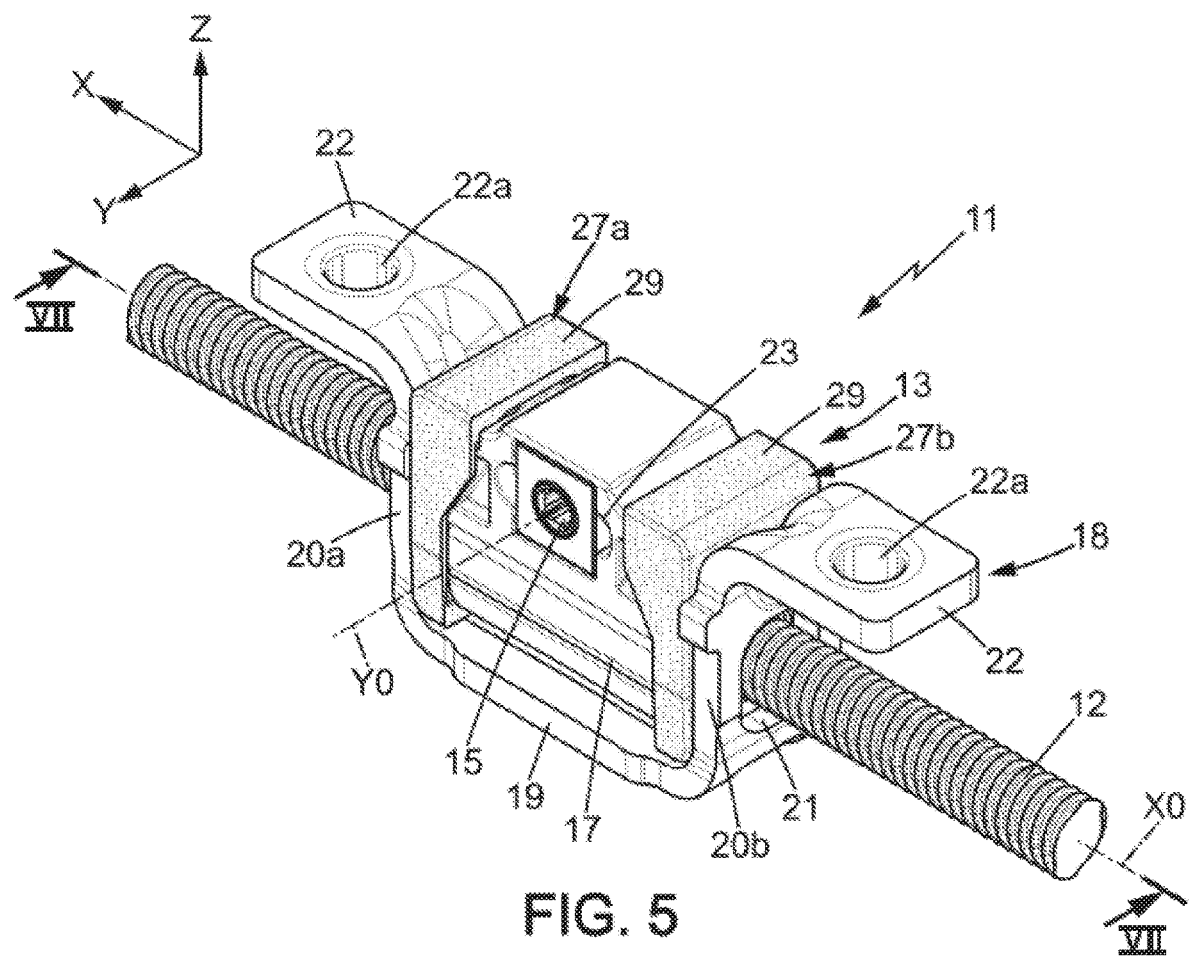
FIG. 5 is a perspective view showing the screw-based adjustment mechanism of the rail of FIGS. 3 and 4.

The first and second transverse walls 20a, 20b may be extended horizontally by two opposite fastening tabs 22 which can be fastened under the upper wall of the movable section (for example by screws 22b screwed into holes 22a of the fastening tabs), as shown in FIGS. 3 to 5.

The casing 17 may be in one piece. In particular, it may be of metal.

Figure 6:
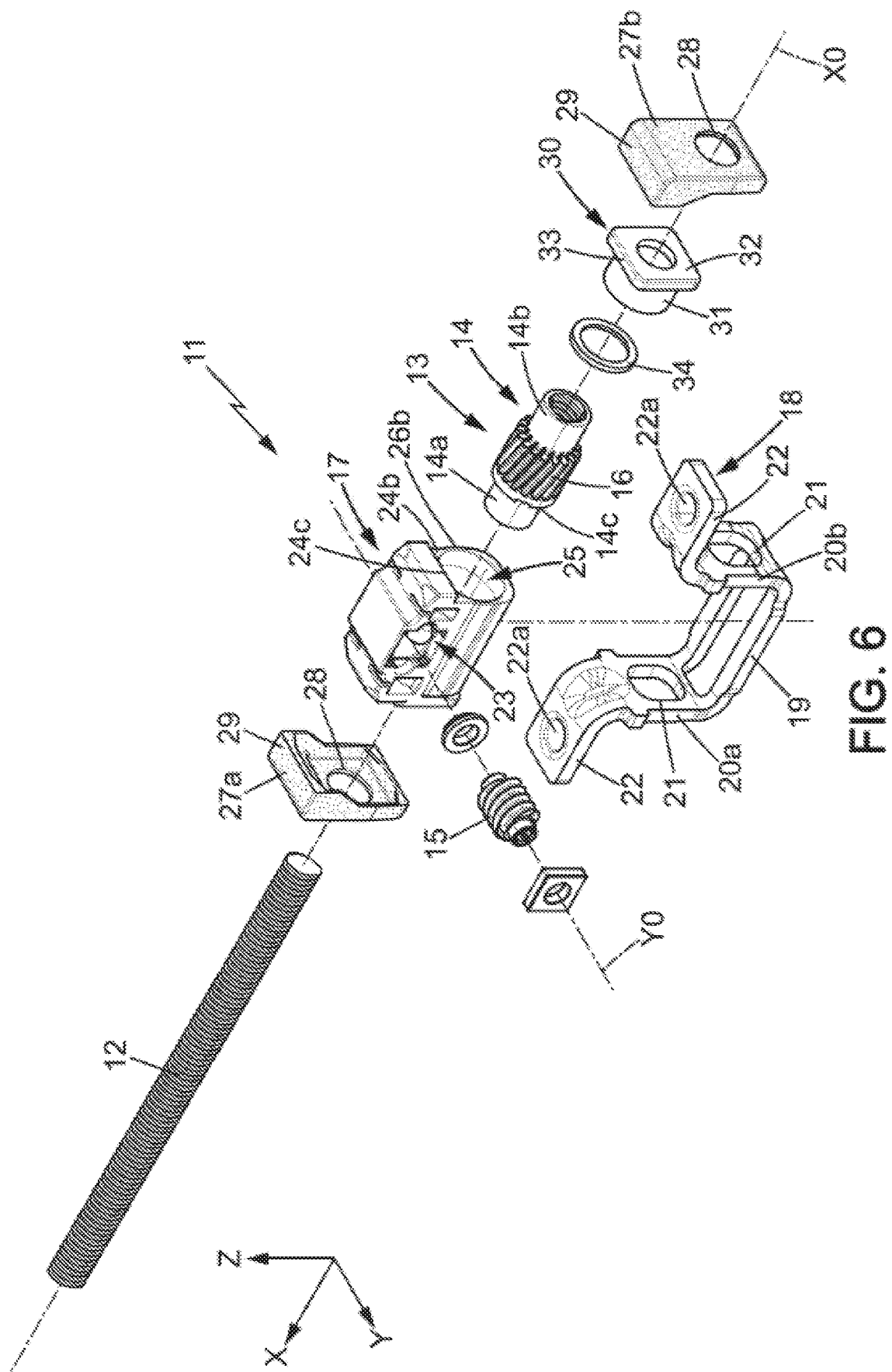
FIG. 6 is an exploded view of the adjustment mechanism of FIG. 5.
Figure 7:
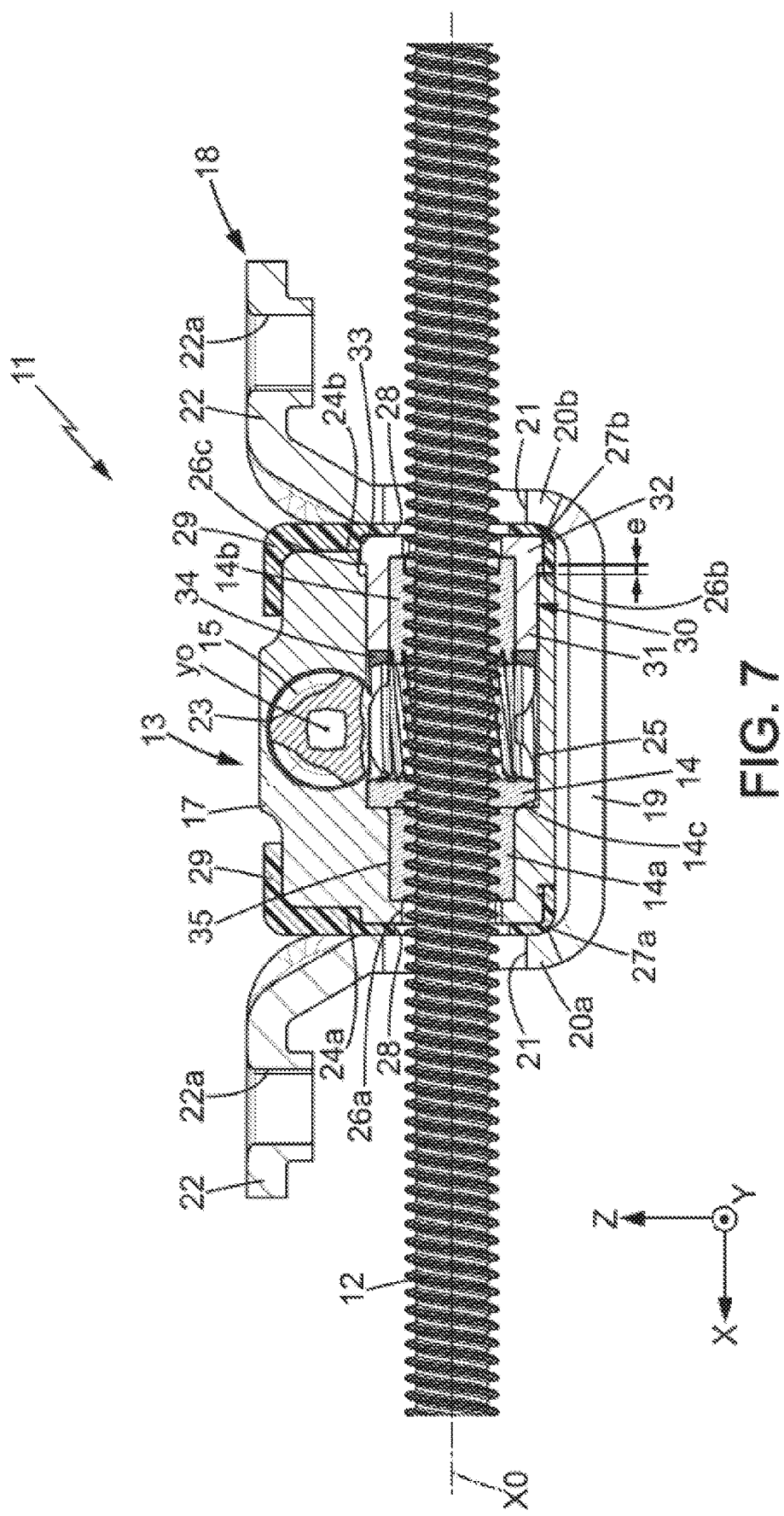
FIG. 7 is a view in vertical axial section of the adjustment mechanism of FIGS. 5 and 6.

As shown in FIGS. 5 to 7, the casing 17 may comprise a worm screw housing 23 within which the worm screw 15 is rotatably mounted.

The casing 17 may have first and second end faces 24a, 24b respectively arranged facing said first and second transverse walls 20a, 20b of the support 18.

The casing 17 comprises a nut housing 25 which extends along the longitudinal axis X0 and opens at the first and second end faces 24a, 24b of the casing in respective first and second openings 26a, 26b, the screw 12 passing through the first and second openings 26a, 26b.

The transmission device 13 may further comprise a first elastomer pad 27a interposed in compression between the first transverse wall 20a of the support and the first end face 24a of the casing (possibly in direct contact with the first transverse wall 20a of the support and the first end face 24a of the casing).

The transmission device 13 may also comprise a second elastomer pad 27b interposed between the second transverse wall 20b of the support and the second end face 24b of the casing (possibly in contact with the second end face 24b of the casing). It is possible that the second elastomer pad 27b is compressed between the second transverse wall 20b of the support and the second end face 24b of the casing (possibly in direct contact with the second transverse wall 20b of the support and the second end face 24b of the casing).

Each elastomer pad 27a, 27b may be in the form of an elastomer plate perpendicular to axis X0, where appropriate pierced by an opening 28 through which the screw 12 passes. Each elastomer pad 27a, 27b may possibly comprise a returning wall 29 partially encompassing the casing 17, in particular at the top.

The transmission device 13 may also comprise a bearing 30, engaged in the second opening 24b of the casing and traversed by the screw 12. The bearing 30 may be of rigid material, in particular metal.

The bearing 30 may be in the form of a ring. It may comprise a cylindrical body 31 which penetrates the nut housing 25 through the second opening 26b, and an enlarged flange 32 which is arranged opposite the second end face 24b of the casing, with a certain clearance e for example of about 1 to several mm. The flange 32 is interposed axially between the second face 26b of the casing and the second elastomer pad 27b. Said flange 32 may have a non-circular edge 33 (for example rectilinear) which engages with a corresponding rim 24c that is part of the second end face 26b of the casing, in order to immobilize the bearing 30 rotationally relative to the casing 17.

The nut 14 is in rigid axial abutment against the free end of the cylindrical body 31 of the bearing (where appropriate with an interposed rigid washer 34) and in rigid axial abutment against the casing in the direction of the first opening 26a, while the flange 32 of the bearing is in elastic axial abutment against the second elastomer pad 27b, which is thus compressed between the bearing 30 and the second transverse wall 20b of the support 20.

Other washers or bearing rings may be provided, in particular on each side of the nut 14, in order to reduce friction and wear.

The nut 14 may comprise first and second cylindrical ends 14a, 14b. The first cylindrical end 14a can rotate within a bore 35 of the casing. The second cylindrical end 14b can be nested in the cylindrical body 31 of the bearing 30.

Said rigid axial abutment of the nut 14 against the casing 17 in the direction of the first opening 26a, can be obtained for example by axial contact between the first cylindrical end 14a and a corresponding portion of the casing, and/or axial contact between a shoulder 14c delimiting said first cylindrical end 14a and a corresponding portion of the casing.

The nut 14 and the bearing 30 may be shaped to fit axially into the casing 17 through the second opening 26b of said casing.

The transmission device 13 is particularly resistant due to the one-piece structure of the casing 17 and to the fact that the elastomer pads 27a, 27b compensate both for the clearance between the casing 17 and the support 18 and the clearance between the nut 14 and the casing 17.

The invention claimed is:

1. A screw-based adjustment mechanism, comprising:
   a screw which extends along a longitudinal axis,
   a support having first and second transverse walls substantially perpendicular to the longitudinal axis,
   a casing mounted on the support between the first and second transverse walls of said support, said casing having first and second end faces respectively arranged facing said first and second transverse walls of said support, and said casing having a nut housing which extends along said longitudinal axis and opens at the first and second end faces of the casing in respective and opposite first and second openings, the screw passing through the first and second openings,
   a first elastomer pad interposed in compression between the first transverse wall of the support and the first end face of the casing,
   a second elastomer pad interposed between the second transverse wall of the support and the second end face of the casing,
   a nut screwed onto said screw, the nut being rotatably mounted in the nut housing of the casing, and
   a bearing engaged in the second opening of the casing and traversed by the screw, the nut being in rigid axial abutment against the bearing in the direction of the second opening,
   wherein the nut is in rigid axial abutment against the casing in the direction of the first opening and the bearing is in elastic axial abutment against the second elastomer pad.

2. The adjustment mechanism according to claim 1, wherein the nut and the bearing are shaped so as to fit axially into the casing through the second opening of said casing.

3. The adjustment mechanism according to claim 2, wherein the casing is a single piece.

4. The adjustment mechanism according to claim 1, wherein the nut comprises first and second cylindrical ends, the first cylindrical end rotating within a bore of the casing and the second cylindrical end fitting into the bearing.

5. The adjustment mechanism according to claim 1, wherein the bearing comprises a flange interposed between the second end face of the casing and the second elastomer pad, axial clearance being provided between said flange and the second end face of the casing.

6. The adjustment mechanism according to claim 5, wherein said flange has a non-circular edge which engages with a rim that is part of the second end face of the casing, in order to immobilize the bearing rotationally relative to the casing.

7. The adjustment mechanism according to claim 1, wherein a rigid washer is interposed axially between the nut and the bearing.

8. The adjustment mechanism according to claim 1, wherein the bearing is made of rigid material.

9. A rail comprising an adjustment mechanism according to claim 1, a fixed section, and a movable section integral to the support of the adjustment mechanism and mounted so as to slide relative to the fixed section in parallel to said longitudinal axis, the screw of the adjustment mechanism being integral to the fixed section.

10. A vehicle seat comprising at least one rail according to claim 9 and a seating portion integral to the movable section of said rail.

* * * * *